(12) United States Patent
Lövkvist

(10) Patent No.: US 6,956,197 B2
(45) Date of Patent: Oct. 18, 2005

(54) METHOD AND AN ARRANGEMENT FOR DETECTING AND DISCHARGING MISPLACED BOARDS AT A SEPARATION ELEVATOR

(75) Inventor: Håkan Lövkvist, Bettna (SE)

(73) Assignee: Parisab AB, Bettna (SE)

( * ) Notice: Subject to any disclaimer, the term of this patent is extended or adjusted under 35 U.S.C. 154(b) by 209 days.

(21) Appl. No.: 10/168,144

(22) PCT Filed: Dec. 11, 2000

(86) PCT No.: PCT/SE00/02489

§ 371 (c)(1),
(2), (4) Date: Dec. 3, 2002

(87) PCT Pub. No.: WO01/44085

PCT Pub. Date: Jun. 21, 2001

(65) Prior Publication Data

US 2003/0132404 A1 Jul. 17, 2003

(30) Foreign Application Priority Data

Dec. 17, 1999 (SE) .............................................. 9904659

(51) Int. Cl.⁷ .......................... H01J 40/14; G06M 7/00; B65G 15/00
(52) U.S. Cl. ............................. 250/223 R; 250/559.36; 198/464.2
(58) Field of Search .............................. 250/221, 222.1, 250/223 R, 559.27, 559.36; 198/464.2, 444, 461.3, 460.1, 459.5

(56) References Cited

U.S. PATENT DOCUMENTS 3,837,469 A * 9/1974 Kihnke ........................ 198/382
4,945,976 A * 8/1990 Ritola ........................ 198/459.5
5,022,511 A * 6/1991 Gorrieri et al. ........... 198/460.1
5,451,771 A * 9/1995 Robertson ................ 250/223 R
5,655,667 A * 8/1997 Isaacs ........................ 209/539
5,662,203 A * 9/1997 St-Pierre et al. ......... 198/463.5
5,890,579 A * 4/1999 Young ...................... 198/459.6
5,904,236 A * 5/1999 Affeldt et al. ............. 198/464.4
6,431,345 B2 * 8/2002 Burgener et al. ......... 198/461.3

FOREIGN PATENT DOCUMENTS

DE  19604075 A1  8/1997
FR  2538567 A1  6/1984
WO  9901854 A1  1/1999

* cited by examiner

Primary Examiner—David Porta
Assistant Examiner—Davienne Monbleau
(74) Attorney, Agent, or Firm—Nixon & Vanderhye P.C.

(57) ABSTRACT

A method and a device for detection and removal of one or more misplaced boards (6) on an elevator for the separation of boards (6). The elevator comprises a frame (1) that supports carrier chains (2) that run over pulley wheels (3, 4) and demonstrate carriers (2.1) on which boards (6) are lifted. The elevator comprises removal devices (5.3, 5.4) for misplaced boards (6). Removal of two or more boards that have been lifted together on one row of equivalently placed carriers (2.1) is achieved with the aid of at least one laser-light detector (10.3, 10.4). Laser light is directed towards the long sides of the boards (6) and reflected laser light is received in the relevant detector (10.3, 10.4). The signals from each detector (10.3, 10.4) are processed in a computer and the boards (6) removed from the elevator with the aid of a removal device (5.3, 5.4) if misplaced boards (6) are registered by the computer.

10 Claims, 5 Drawing Sheets

METHOD AND AN ARRANGEMENT FOR DETECTING AND DISCHARGING MISPLACED BOARDS AT A SEPARATION ELEVATOR

This application is the US national phase of international application PCT/SE00/02489 filed 11 Dec. 2000, which designated the US.

TECHNICAL FIELD

The present invention concerns a method and a device for detection and discharge or removal of one or more misplaced boards on an elevator for the separation of boards that are collected from a magazine of boards. The elevator comprises a frame that supports two or more carrier chains. These carrier chains pass over both an upper pulley wheel and a lower pulley wheel, and are provided with carriers on which the boards are lifted from the magazine. The elevator comprises removal devices for boards from the carriers.

BACKGROUND TECHNOLOGY

Separation of boards is used within the sawmill industry for several different purposes, for example, before an edge sawing machine, in which one board at a time is fed in a longitudinal direction into the edge sawing machine with the aid of a feed conveyor in order to be sawn to the desired width. The feed conveyor is usually fed in turn by a cross-conveyor, onto which the boards are taken off from a separating device, usually in the form of an elevator displaying carrier chains with carriers on which the boards are collected from a magazine of boards that have been split off from a log. It occurs in known elevators for separation of boards that the boards are collected by the carriers in a manner that is not desired, which results in the boards not being separated satisfactorily, but continuing to the subsequent sawing operation placed on top of each other. Thus, it is necessary to situate a monitor beside such conveyor in order manually to remove misplaced boards.

Various devices have been suggested in order automatically to prevent boards leaving the separating elevator on top of each other or too closely after each other. Such devices are known from, for example, the Swedish patent documents SE-B-423 221, SE-B-414 910 and SE-C-329 568. The devices described in these documents, however, are purely mechanical and cannot solve all the problems with misplaced boards that can arise at a separating elevator. The intention of the present invention is therefore to achieve a separating elevator that is an improvement over those that are already known.

DESCRIPTION OF THE INVENTION

During the method according to the invention, indication and removal/discharge of two or more misplaced boards are achieved in one or several ways.

In a situation in which two or more boards are lifted together on a row of equivalently situated carriers, removal is achieved with the aid of at least one laser-light detector arranged at the upward feeding side of the elevator, whereby laser light is directed towards the long sides of the boards and reflected laser light is received in the relevant detector. The signals from each detector are processed in a computer that is connected to a removal device that is arranged at the upward feeding side of the elevator. The boards are removed from the elevator with the aid of the removal device if it has become evident during the processing of the signals in the computer that the distance between the relevant detector and the boards decreases gradually during the passage of the boards past the relevant detector.

If in this situation two or more boards are lifted together placed on top of each other with the more forward board at the bottom of a row of equivalently situated carriers, removal is achieved with the aid of at least one first laser-light detector arranged on the outer side of the upward feeding side of the elevator, from which laser light is directed towards the upper long sides of the boards and reflected laser light is received in the first detector. On the other hand, if two or more boards are lifted placed on top of each other with the more forward boards at the top of a row of equivalently situated carriers, removal is achieved with the aid of at least one second laser-light detector arranged on the inner side of the upward feeding side of the elevator, from which laser light is directed towards the lower long sides of the boards and reflected laser light is received in the second detector.

In a situation in which one or more boards are lifted with one in front of the other on a row of equivalently situated carriers, removal is achieved with the aid of two or more first photocells placed along a horizontal line on the upward feeding side of the elevator. The first photocells send signals to a computer, in which it is registered whether the first photocells indicate a light gap between a first board and a subsequent board following the passage of the front edge of the first board past the first photocells. The motion of the carrier chains is stopped as a consequence of this indication when the first board has reached an acceleration device arranged at the upper part of the elevator, and it is started again after a time interval during which the first board is removed with the aid of the acceleration device. The period of delay can consist of checking for the existence of a remaining "light gap" at certain intervals, and it can be controlled by the computer.

In a situation in which one or more boards are lifted tilted with respect to the horizontal plane on carriers in two or more rows of equivalently situated carriers, removal is achieved with the aid of two or more second photocells situated along a horizontal line on the upward feeding side of the elevator. These second photocells send signals to a computer in which it is indicated if the second photocells are placed in shadow simultaneously or not during the passage of the boards, whereby, if the second photocells are not placed in shadow essentially simultaneously, the computer sends a signal to the removal device, which induces removal of the boards. Tilted boards are indicated if the second photocells are not placed in shadow within a certain time period following the indication that one of the second photocells is in shadow. The reason for this is that the boards in general have a width that decreases from one end before they have been edge-sawn, which means that one of the second photocells is generally placed in shadow before the second.

Further photocells can be exploited in order to indicate whether the carriers are empty as they progress up the upward feeding side of the elevator. This indication is used to increase the speed of the carriers when it is the turn of the empty carriers to pass the upper pulley wheel. The degree of occupation of the elevator, and thus its capacity, is increased by increasing the speed of the carrier chains in such circumstances. A pulse counter is used in order to control the period of time during which the higher speed is used; the pulse counter is placed in connection with the first motor and sends pulses to the computer. A certain number of pulses corresponds to the distance between two carriers, that is, the speed of the carriers can be increased to a pre-determined level during this number of pulses. Signals are in this situation sent from the computer to the first motor to increase or decrease the speed of the carrier chains.

Further details and characteristics concerning the invention are made clear by the description of the drawings below, and by the claims.

DESCRIPTION OF THE DRAWINGS

The invention is described below in the form of embodiments in association with the appended drawings.

Figure 3:
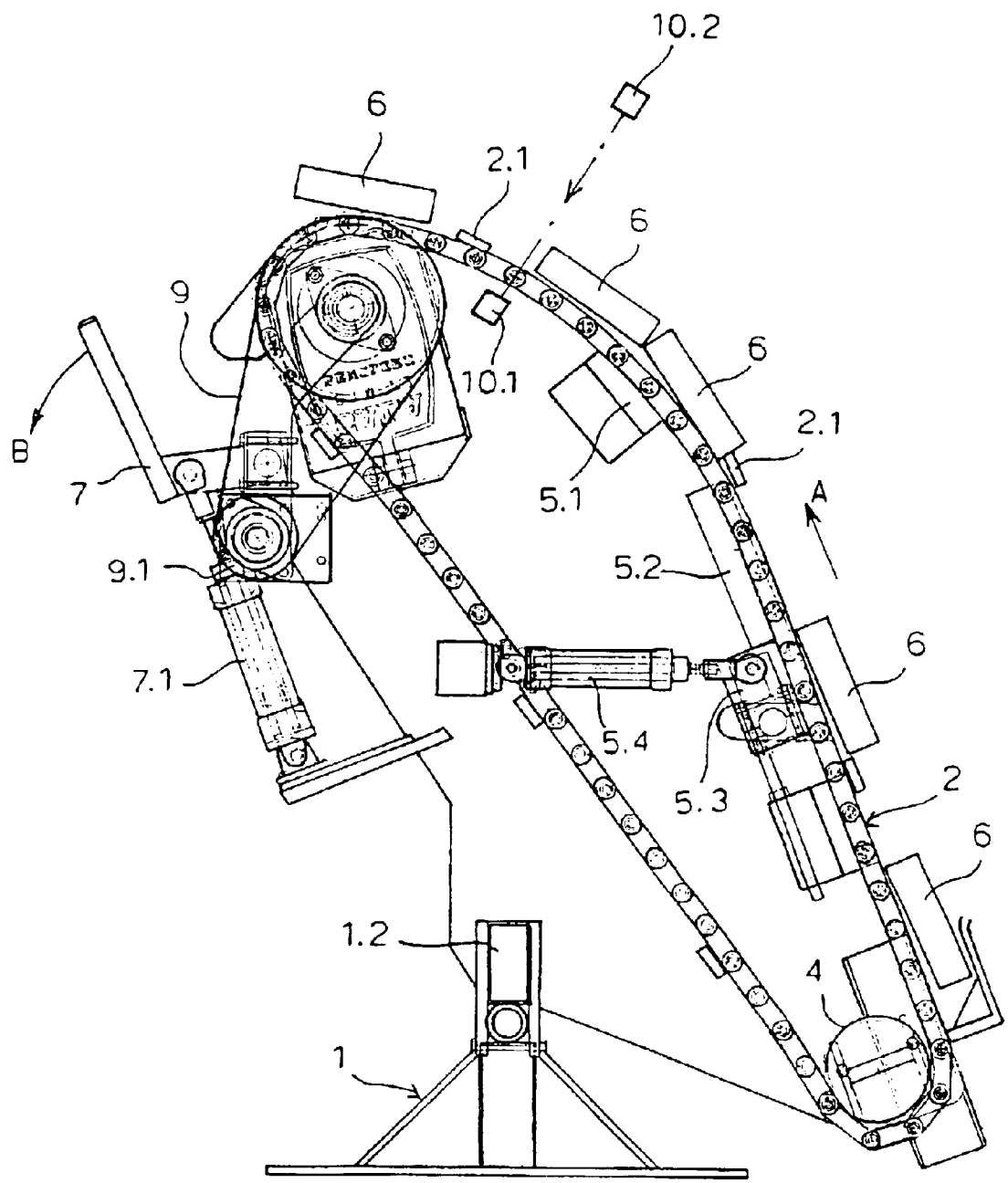
FIG. 3 shows enlarged a cross-section through the elevator according to FIG. 1.

The elevator shown in the figures comprises a frame 1 that is placed on a support such as the floor of a sawmill. The frame 1 comprises an upper horizontal beam 1.1 and a lower horizontal beam 1.2 and supports a number of carrier chains 2 equipped with carriers 2.1 that run in planes perpendicular to the longitudinal direction of the elevator. Each carrier chain 2 runs over an upper pulley wheel 3 and a lower pulley wheel 4 and via an upper slider 5.1 and a lower slider 5.2, both of which support the carrier chain 2. A removal arm 5.3 is arranged such that it can be folded out from the carrier chains 2 with the aid of a pneumatic or hydraulic removal cylinder 5.4. The removal arm 5.3 may be subject to manual influence and is activated when two or more boards 6 have been collected by the carriers 2.1 and become disorganised. The upper pulley wheel 3 is driven by a first electric motor 3.2 via a drive shaft 3.1 that is common for all pulley wheels 3. Boards 6 are carried in the direction of the arrow A in FIG. 3 from a magazine of boards at the lower end of the elevator, not shown in the figures, and up to a number of interacting removal arms 7, from which one board at a time is removed on a cross-conveyor, for, for example, measurement of width or insertion into an edge sawing machine. The removers 7 are manoeuvred with the aid of pneumatic cylinders 7.1 and are folded outwards in the direction of the arrow B in FIG. 3 during removal of a board.

With the purpose of separating two or more boards 6, where the first board 6 is supported on a second board 6 on the same row of carriers 2.1, a number of acceleration wheels 8 are arranged freely rotating on the upper drive shaft 3.1 and placed between two neighbouring carrier chains 2. Each acceleration wheel 8 is driven by a driving chain 9, which is in turn driven by chainwheels 9.1 arranged on a common lower drive shaft 9.2 in order to to transfer power, which is in its turn driven by a second electric motor 9.3. The driving chain 9 at each acceleration wheel 8 demonstrates teeth arranged peripherally, which teeth are located at a diameter somewhat greater than the outer pathway of the carrier chain 2 as this passes over the upper pulley wheel 3, i.e. the teeth on the driving chain 9 protrude beyond the carriers 2.1 at the upper pulley wheel 3. Furthermore, the acceleration wheels 8 rotate at a higher rate of revolution than the pulley wheels 3, whereby the teeth of the driving chain achieve a higher peripheral speed than the carriers 2.1 at the upper pulley wheels 3. Separation is achieved in that the teeth of the driving chain 9 of the relevant acceleration wheel 8 are brought to grip the first board 6, which in this way is "pulled loose" from the carrier chains 2 and removed by the removal arms 7, while the second board 6 remains on the carrier chains 2. Separation is achieved on the condition that a sufficiently large difference in speed exists between the carrier chains 2 and the driving chains 9 at the acceleration wheels 8.

In order to ensure separation, the motion of the carrier chains 2 is stopped when two or more boards 6 are lifted simultaneously during the period that is required for the driving chain 9 of the acceleration wheels 8 to have time to grip the first board and to remove it onto the removal arms 7. The first motor 3.2, which drives the carrier chains 2, is thus stopped with the aid of one or more first photocells 10.1 that are placed on the lower side of the carrier chains 2 on the upward feeding side of the elevator and that are illuminated by corresponding light sources 10.2. When a "light gap" is indicated, once the front edge of the forward board has passed the first photocells 10.1, the motion of the carrier chains 2 is stopped after a distance at which the "light gap" is located exactly in front of the driving chains 9 of the acceleration wheels 8. In this position, the acceleration device 8, 9 can grip the forward board 6. The motion of the carrier chains 2 is restarted after a certain time delay, whereby the second board in the sequence is removed on the removal arms 7. Stopping and starting the first motor 3.2 occurs through processing in a computer of the signals from the first photocells 10.1.

Figure 4:
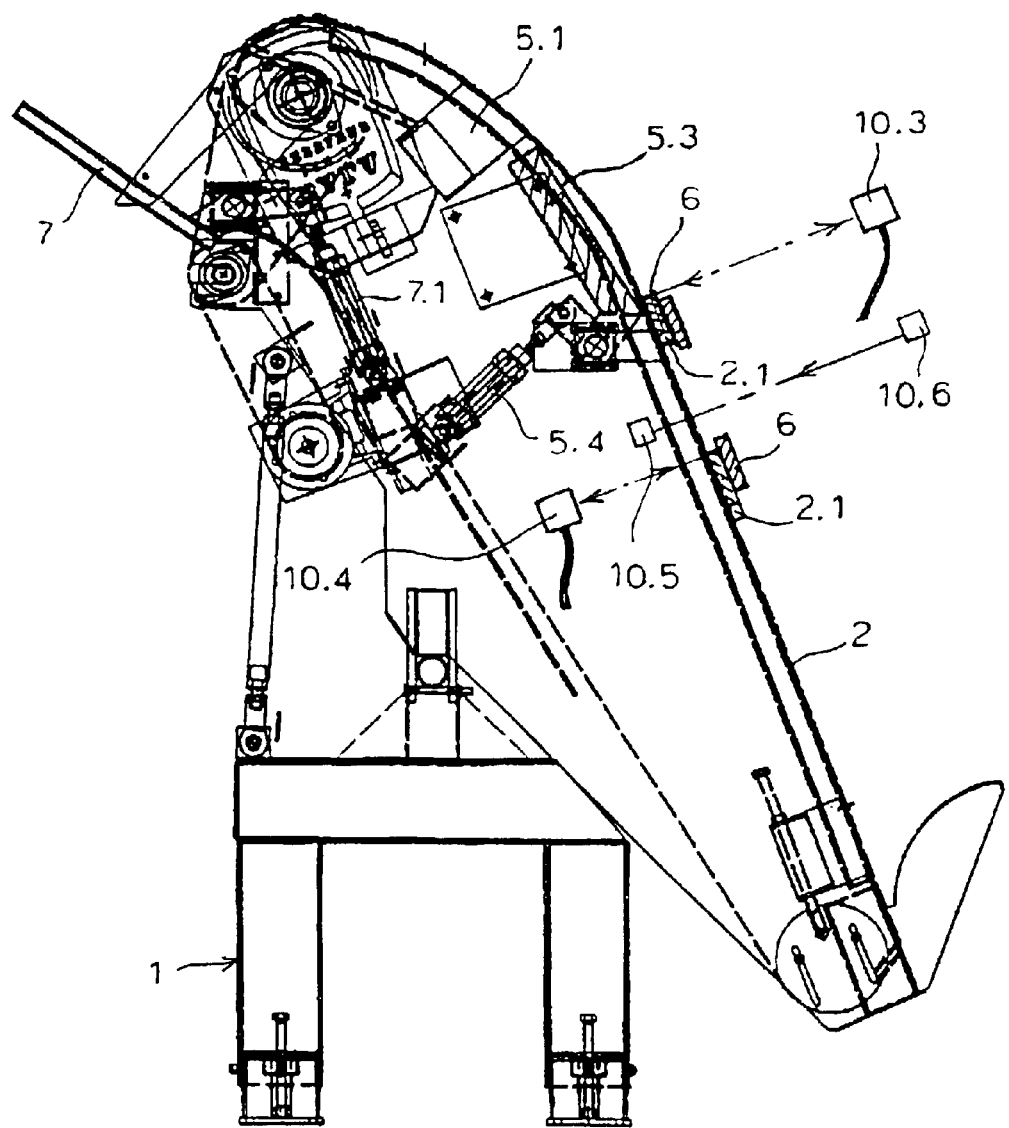
FIG. 4 shows an alternative embodiment of the elevator, also in cross-section.

The elevator shown in FIG. 4 demonstrates an alternative embodiment in which a removal arm 5.3 is also arranged to be influenced automatically by a pneumatic removal cylinder 5.4 in order to be able to remove boards 6 from the carriers 2.1 on the carrier chain 2 in those cases in which two boards 6 placed one on top of the other have been collected by a row of equivalently placed carriers 2.1. The removal cylinder 5.3 is controlled by a first detector 10.3, from which laser light is emitted in a direction essentially perpendicular to the long axis of the boards 6 from the outer surface of the elevator, and a second detector 10.4, from which laser light is emitted in a similar manner from the inner surface of the elevator. The reflected laser light is then received by the detectors 10.3, 10.4, which are designed as distance meters and indicate the distance to the upper surface and lower surface, respectively, of a passing board 6.

Figure 5:
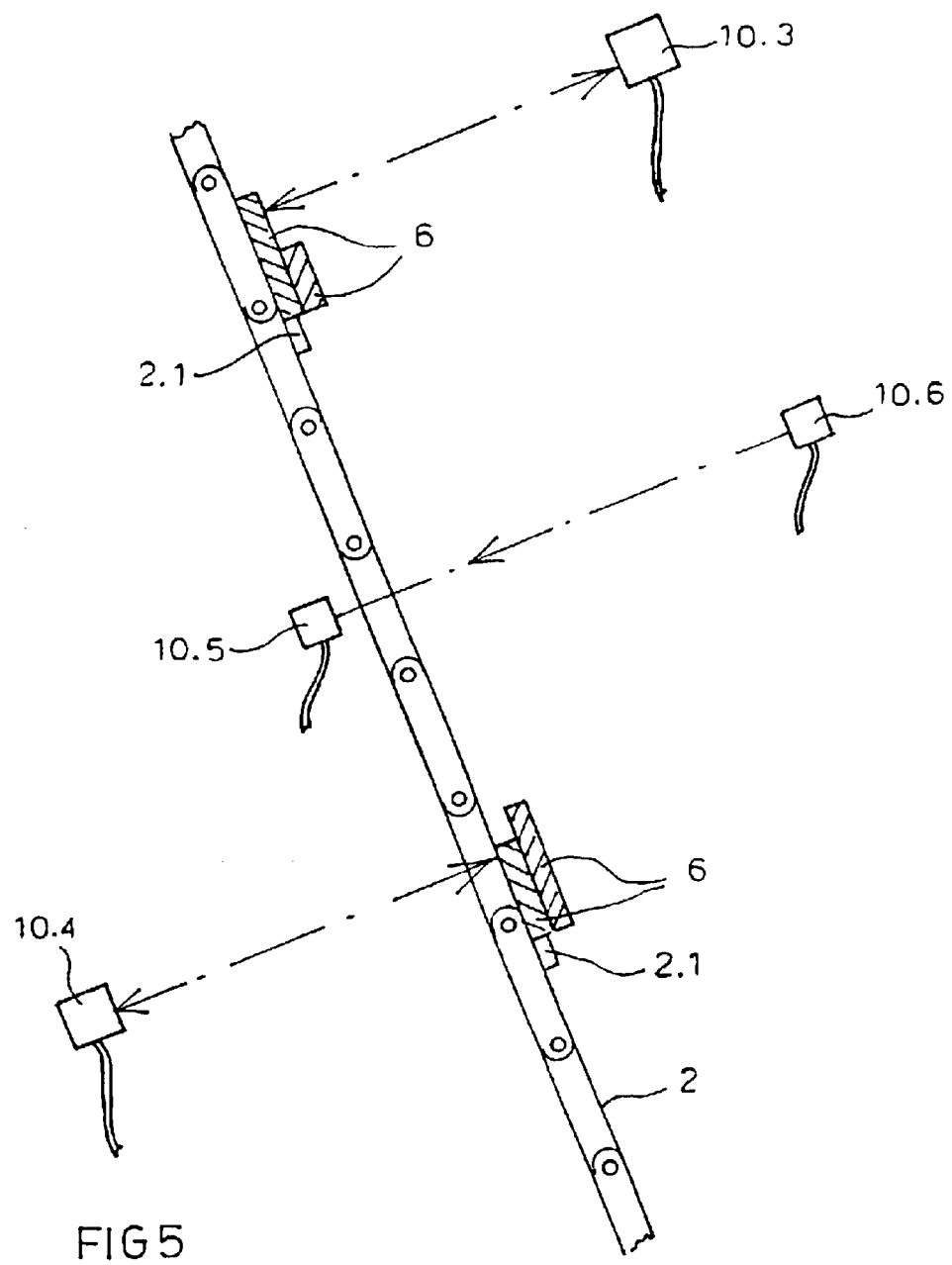
FIG. 5 shows an enlarged section of the upward feeding side of the elevator shown in FIG. 4.

In the enlarged section of the upward feeding side of the elevator shown in FIG. 4, the two positions at which two boards 6 have been unintentionally collected by one carrier 2.1 are made clear. At the upper carrier 2.1 in FIG. 5, a first board 6 has been collected in the normal manner while a second and narrower board 6 has hooked on to the first board 6 with its front edge displaced a certain distance behind the front edge of the first board 6. With the aid of the upper detector 10.3 an indication is given that the front edge of the first board 6 passes the laser-light beam, which normally should be followed by the rear edge and the carrier 2.1 together passing the light beam. If, on the contrary, a further front edge is indicated, that is, a shorter distance to the surface of the second board 6 is indicated, the removal cylinder 5.4 is activated, whereby both boards 6 are removed from the carriers 2.

At the lower carrier 2.1 in FIG. 4 a first board 6 has been collected in the normal way, while a second and broader board 6 has hooked on to the first board 6 with its upper edge displaced a certain distance in front of the front edge of the first board 6. This condition cannot be indicated by the upper detector 10.3, which indicates that only one board 6 passes.

With the aid of the lower detector 10.4, however, an indication is given that the front edge of the second board 6 passes the laser-light beam and that after this the front edge of the first board 6 passes the light beam, that is, a shorter distance to the surface of the first board 6 is indicated, the removal cylinder 5.4 is activated, whereby both boards are removed from the carriers 2.1.

Figure 1:
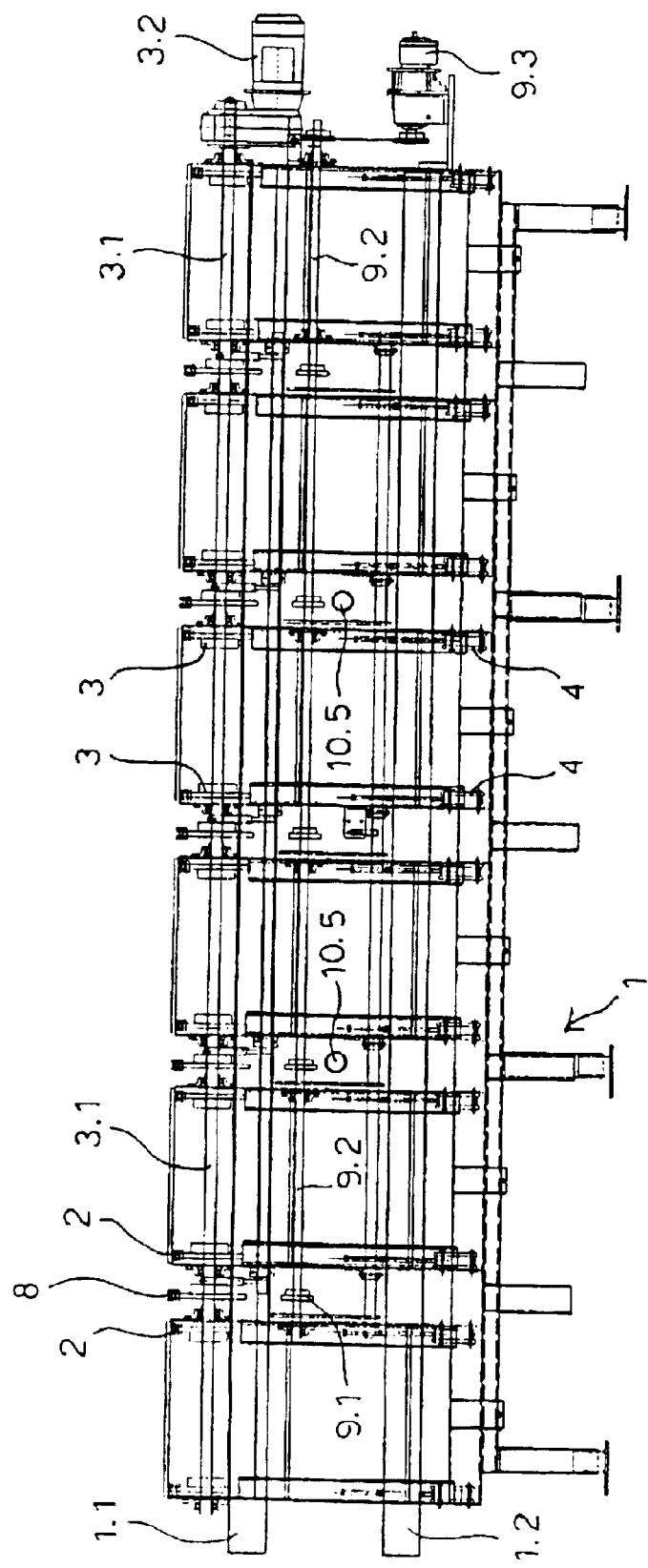
FIG. 1 shows an elevator for the transverse feeding of boards viewed from one long side.
Figure 2:
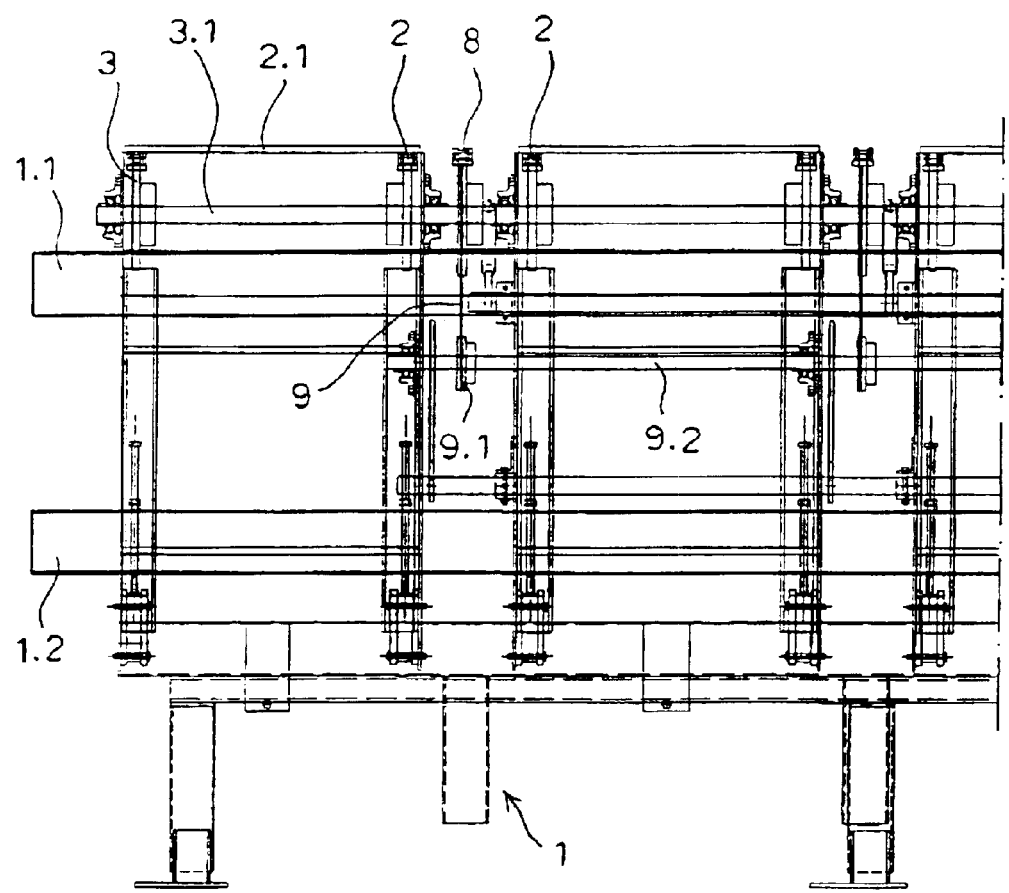
FIG. 2 shows enlarged a section of the left end of the elevator according to FIG. 1.

In the case in which one or more boards 6 are fed upwards tilted over the upward feeding side of the elevator, that is, resting on carriers 2.1 in two different rows of equivalently placed carriers 2.1, this is indicated with the aid of two photocells 10.5 placed at the same height on the upward feeding side of the elevator, between two pairs of carrier chains 2.1 as is shown in FIG. 1, and illuminated by the associated light sources 10.6. When the light beam is broken simultaneously by a passing board 6, this is indicated as normal. If, however, the light beam to only one of the photocells 10.5 is broken, this indicates a tilted board, whereby the removal cylinder 5.4 is activated and the board is removed from the carriers 2.1.

Further photocells, not shown on the figures, are used also to indicate if the carriers 2.1 pass empty up the upward feeding side of the elevator. This indication is used to increase the speed of the carrier chains 2 when it is the turn of the empty carriers 2.1 to pass the upper pulley wheels. In order to control the length of time that the higher speed is to be applied, a pulse counter that communicates with the first motor 3.2, and that sends pulses to the computer, is used. A certain number of pulses corresponds to the distance between two carriers 2, that is, during this number of pulses the speed of the carriers 2 can be increased to a predetermined value. Signals are subsequently sent from the computer to the first motor 3.2 for increase and decrease of the speed of the carrier chains 2.

What is claimed is:

1. A device for detection and removal of one or more boards on an elevator for separation of boards collected from a magazine of boards, said elevator comprising a frame for supporting two or more carrier chains, upper and lower pulley wheels, and carrier chains about said upper and lower pulley wheels, carriers for lifting the boards from the magazine, said elevator including removal devices for removing the boards from the carriers, at least one laser light detector arranged on the upward feeding side of the elevator for directing laser light towards long sides of the boards and receiving reflected laser light, a computer for receiving and processing signals received from the detector and a removal device controlled by the computer for removing boards if the signals processed in the computer indicate that the distance between each laser light detector and the boards gradually decreases during the passage of the boards past the first detector, said device further including at least two or more first photocells positioned along a horizontal line on the upward feeding side of the elevator to determine whether one or more boards have been lifted with one in front of the other on one row of equivalently placed carriers and an acceleration device to remove the one or more boards lifted with one in front of the other; and two or more second photocells disposed along a horizontal line on the upward feeding side of the elevator to determine whether or not one or more boards have been lifted tilted.

2. A device according to claim 1 including at least one first laser light detector on the outer side of the upward feeding side of the elevator for directing laser light towards the long sides of the boards and receiving reflected laser light.

3. A device according to claim 2 including at least one second laser light detector on the inner side of the upward feeding side of the elevator for directing laser light towards the long sides of the boards and receiving reflected laser light.

4. A device according to claim 1 wherein the two or more first photocells are arranged to send signals to a computer, said computer processing said signals to determine whether the first photocells indicate a light gap between a first board and a subsequent board after passage past the first photocells of the front edge of the first board, an acceleration device arranged at the upper part of the elevator and responsive to the computer to enable the carrier chains to be stopped when the first board has reached the acceleration device and started again after a period during which the first board is removed by the acceleration device.

5. A device according to claim 1 wherein the two or more second photocells are arranged to send signals to a computer, said computer processing said signals to indicate whether the second photocells are shadowed simultaneously or not upon the boards passing the two or more photocells and if not shadowed simultaneously sending a signal to the removal device enabling removal of the boards.

6. A method for detection and removal of one or more misplaced boards on an elevator wherein the elevator includes a frame for supporting two or more carrier chains, upper and lower pulley wheels over which the carrier chains run, carriers on which the boards are lifted from a magazine of boards, and removal devices for the boards from the carriers comprising the steps of:

(a) removing two or more boards lifted together on one row of equivalently placed carriers by providing a plurality of laser light detectors on an upward feeding side of the elevator, directing laser light towards the long sides of the boards, receiving reflected laser light in the detectors, processing signals from each detector in a computer, and removing boards from the elevator by actuating said removal device if during the processing of the signals in the computer the distance between each detector and the boards gradually decreases during passage of the boards past the detectors;

(b) removing one or more boards that have been lifted with one in front of the other on one row of equivalently placed carriers by positioning two or more first photocells along a horizontal line on the upward feeding side of the elevator and removing the one or more boards by operating an acceleration device; and (c) removing one or more boards that have been lifted tilted with respect to a horizontal plane on said carriers in two or more rows of equivalently positioned carriers by providing an additional two or more second photocells along a horizontal line on the upward feeding side of the elevator and operating a removal device responsive to at least one of said second photocells.

7. A method according to claim 6 wherein step (a) includes providing one of the laser light detectors on an outer side of the upward feeding side of the elevator, directing laser light towards the upper long sides of the boards and receiving reflected laser light by the one detector.

8. A method according to claim 6 wherein step (a) includes disposing at least one second laser light detector on an inner side of the upward feeding side of the elevator, directing laser light from said second laser light detector towards the lower long sides of the boards and receiving reflected laser light by the second detector.

9. A method according to claim 6 wherein step (b) includes transmitting signals from the two or more first photocells to a computer, registering in the computer whether the first photocells indicate a light gap between a first board and a subsequent board after passage of the front edge of the first board, past the first photocells stopping the motion of the carrier chains when the first board has reached an acceleration device arranged at the upper part of the elevator, and starting the motion of the carrier chain after a period during which the first board is removed by the acceleration device.

10. A method according to claim 6 wherein step (c) includes transmitting signals from the two or more second photocells to a computer, determining in the computer whether the second photocells are shadowed simultaneously or not upon the boards passing the two or more photocells, and if not shadowed simultaneously, sending a signal from the computer to the removal device to remove the boards.

* * * * *